UNITED STATES PATENT OFFICE.

WILLIAM W. GUEST, OF ALAMEDA, CALIFORNIA.

EXTRACTION OF PRECIOUS METALS.

1,067,022.  Specification of Letters Patent.  Patented July 8, 1913.

No Drawing.  Application filed October 15, 1912. Serial No. 725,835.

*To all whom it may concern:*

Be it known that I, WILLIAM W. GUEST, a citizen of the United States, residing at Alameda, in the county of Alameda and State of California, have invented new and useful Improvements in the Extraction of Precious Metals, of which the following is a specification.

My invention relates to the extraction and recovery of precious metals in chemical or mechanical combinations or associated with black and other sands and ores carrying said precious metals.

The invention consists in the web treatment of such sands and ores with a combination of the nitrates, hydrates, chlorates, hyposulfites, and hypochlorites of the alkaline metals, or, a combination of any three or more of them dissolved in water in the proportion of twenty to eighty grams, more or less, of the combined salts, combined in approximately equal proportions of each, and dissolved in approximately one liter of water, depending upon the character of the sands or ores to be subjected to treatment for the recovery of the precious metals therefrom by grinding to a slime in the solution, using approximately one ton of solution per ton of sands or ores, and by subsequent amalgamation and electrolysis.

The treatment of black sands and ores for the recovery of the precious metals therefrom by a solution made up of a combination of the salts of the alkaline metals, hereinbefore mentioned, in approximately equal proportions produces a chemical change in the said ores, sufficient to render all of the bases contained therein soluble in water, in that soluble chlorates, sulfates, arsenites, arsenates, nitrates and hypochlorites of the base metals and metalloids are formed, releasing and cleaning the precious metals of the substances preventing amalgamation with quicksilver; and in the case of platinum by the use of an electrical current passing through the solution, holding the platinum in contact with a metal plate saturated with quicksilver, due to the generation of a static electrical condition of the plate. No exact proportions of a combination of all or any of the salts mentioned, or the actual percentage of salts in solution, can be given, due to the fact that no two ores are of the same character, but are variable in composition. Hence, it is essential that the solution also be variable in composition, not so much from a point of efficacy in the recovery of precious metals and by-products of base metals and metalloids, as in the matter of economy in the cost of treatment. Therefore, only approximate proportions of salts and percentage of solution can be given, except that the process requires an excess approximately of ten per cent. of the elements to be used in the solution to produce complete decomposition of the sands or ores and extraction of the precious metals and by-products therefrom, as would be shown by an analysis of an average sample of such sands and ores before treatment; but in all cases the extraction of the precious metals is complete and depends only upon the length of time the sands and ores are subjected to treatment and the fineness to which the sands and ores are reduced by grinding in the solution. In the case of black sands and ores containing no refractory substances, such as bismuth, antimony, arsenic, tungsten, tellurium, selenium, or any other metalloid, the time of contact is not to exceed one hour. When the ores contain any or all of the refractory substances, above mentioned, complete extraction requires a length of contact with the solution ranging from one hour upward with continued agitation to secure complete extraction of the precious metals and the bases. To secure the precious metals only from such refractory ores, a contact with the solution of not to exceed twelve hours is sufficient.

Having thus described my invention, what I claim and desire to secure by Letters Patent is—

1. A method for the extraction and recovery of precious metals from sands and ores, said method consisting in grinding the sands or ores in a solution of the nitrates, hydrates, chlorates, hyposulfites, and hypochlorites of the alkaline metals and the subsequent amalgamation of the precious metals by agitating and circulating the slimes containing said salts in contact with a mercury cathode.

2. A method for extracting precious metals from sands and ores, said method consisting in reducing the material to a watery slime, by grinding the sands or ores in a solution containing in approximately equal proportions, a nitrate, a chlorate, and a hydrate of an alkaline metal and recovering said precious metals by agitating and circulating said slimes in contact with metallic mercury.

3. A method for separating precious metals from sands and ores, said method consisting in reducing the material to a watery slime, by grinding the sands or ores in a solution containing in approximately equal proportions, a nitrate, a hyposulfite and a hydrate of an alkaline metal, and recovering said precious metals by agitating and circulating said slime in contact with metallic mercury.

4. A method for separating precious metals from sands and ores, said method consisting in reducing the material to a watery slime, by grinding the sands or ores in a solution containing in approximately equal proportions, a nitrate, a hypochlorite, and a hydrate of an alkaline metal, and recovering the said precious metals by agitating and circulating said slime, in contact with metallic mercury.

5. A method for separating precious metals from sands and ores, said method consisting in reducing the material to a watery slime, by grinding the sands or ores in a solution containing in approximately equal proportions, a nitrate, a chlorate, a hypochlorite, and a hydrate of an alkaline metal and recovering the said precious metals by agitating and circulating said slime, in contact with metallic mercury.

6. A method for separating precious metals from sands and ores, said method consisting in reducing the material to a watery slime, by grinding the sands or ores in a solution containing in approximately equal proportions, a nitrate, a hypochlorite, a hyposulfite and a hydrate of an alkaline metal, and recovering the said precious metals by agitating and circulating said slimes containing said salts, in contact with metallic mercury.

7. A method for separating precious metals from sands and ores, said method consisting in reducing the material to a watery slime, by grinding the sands or ores in a solution containing in approximately equal proportions, a nitrate, a chlorate, a hyposulfite and a hydrate of an alkaline metal, and recovering the said precious metals by agitating and circulating said slimes, in contact with metallic mercury.

In testimony whereof I have hereunto set my hand in the presence of two subscribing witnesses.

WILLIAM W. GUEST.

Witnesses:
JOHN H. HERRING,
W. W. HEALEY.